United States Patent
Maron

(10) Patent No.: US 7,427,913 B2
(45) Date of Patent: Sep. 23, 2008

(54) METHOD AND DEVICE FOR TRANSMITTING SAFETY-CRITICAL OPERATING CONDITIONS OF A MOTOR VEHICLE

(75) Inventor: Christof Maron, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 294 days.

(21) Appl. No.: 10/532,450

(22) PCT Filed: Oct. 17, 2003

(86) PCT No.: PCT/EP03/11571

§ 371 (c)(1),
(2), (4) Date: Oct. 26, 2005

(87) PCT Pub. No.: WO2004/037614

PCT Pub. Date: May 6, 2004

(65) Prior Publication Data
US 2006/0113138 A1 Jun. 1, 2006

(30) Foreign Application Priority Data
Oct. 24, 2002 (DE) .................. 102 49 479

(51) Int. Cl.
*B60Q 1/00* (2006.01)

(52) U.S. Cl. ............... 340/438; 340/425.5; 340/439
(58) Field of Classification Search ........... 340/425.5, 340/438, 439, 426.24, 426.25, 426.32, 426.31; 701/301, 117
See application file for complete search history.

(56) References Cited

U.S. PATENT DOCUMENTS 5,357,438 A * 10/1994 Davidian .................. 701/301

FOREIGN PATENT DOCUMENTS

| DE | 35 10321 A1 | 10/1986 |
| DE | 37 31 109 A1 | 3/1989 |
| DE | 43 02 925 A1 | 8/1994 |
| DE | 197 35 017 A1 | 2/1999 |

* cited by examiner

*Primary Examiner*—Daryl C Pope
(74) *Attorney, Agent, or Firm*—Ratner Prestia

(57) ABSTRACT

A method for transmitting a safety-critical operating condition of a safety-critical system of a motor vehicle to the driver, and a device for implementing the method. Transmission of a safety-critical operating condition to the driver by a control lamp can be disrupted if the control lamp is broken or the driver ignores the control lamp. To this end, measures are provided which reduce the driving comfort of the driver and draw his attention to the safety-critical operating condition.

16 Claims, 1 Drawing Sheet

METHOD AND DEVICE FOR TRANSMITTING SAFETY-CRITICAL OPERATING CONDITIONS OF A MOTOR VEHICLE

TECHNICAL FIELD

The present invention generally relates to a method for transmitting safety-critical operating conditions and more particularly relates to a method for transmitting a safety-critical operating condition of a safety-critical system of a motor vehicle to the driver of a vehicle.

BACKGROUND OF THE INVENTION

DE 199 61 871 A1 discloses a driver information system detecting several operational data of a motor vehicle by means of a control unit and defining a priority in terms of the relevance of the operational data for the driver and transmitting it to the driver by means of a signal. It is considered a shortcoming in the prior art driver information system that a defect of the output unit drawing the driver's attention to critical operating conditions by way of an optical and/or audible signal is not discovered.

BRIEF SUMMARY OF THE INVENTION

In view of the above, an object of the invention is to develop a method of transmitting a safety-critical operating condition of a motor vehicle to the driver that operates reliably even if optical or acoustic output units are defective.

According to the invention, this object is achieved in that measures are provided making the driver aware of the safety-critical operating condition by way of an impaired comfort. Further, it is thereby ensured that the driver cannot ignore optical and/or audible signals of an operative output unit indicative of a safety-critical operating condition.

In a favorable improvement, the measures are taken on a temporally limited basis and/or a recurrent basis, and the measures are carried out in consideration of the current driving situation. Due to these measures resulting in loss in comfort it is unmistakably conveyed to the driver that the motor vehicle suffers from at least one safety-critical operating condition.

To render the idea of the invention more precise, it is arranged for to carry out the measures in consideration of the current driving situation, and the selection of the measures depends on the duration and/or the seriousness of the safety-critical operating condition as regards the safety of operation of the motor vehicle.

In a particularly favorable manner, the measures involve a deactivation of the internal combustion engine during standstill of the motor vehicle that is unwanted by the driver or an actuation of the acoustic alarm device (horn) unwanted by the driver when the doors of the motor vehicle are opened and closed.

According to further favorable embodiments, the measures involve an operation of the electric window lifters unwanted by the driver during standstill of the motor vehicle or a deactivation of the multimedia device unwanted by the driver.

In a particularly advantageous embodiment the measures represent a faulty oil-level tell-tale or a faulty tank capacity tell-tale. Besides, the measures involve a raised temperature indication or an incorrect rotational speed indication of the internal combustion engine of the motor vehicle.

Further, the measures involve an actuation of the electrically adjustable outside rearview mirrors or of the electrically adjustable seats during standstill of the motor vehicle being unwanted by the driver.

According to another realization of the idea of the invention, the measures involve switching on the dimmed headlight unwanted by the driver or switching off the power steering system unwanted by the driver.

In another favorable design of the subject matter of the invention, the measures involve an additional signal in a brake system with electronically adjustable brake forces which influences the desired brake force to such effect that a fluctuation in the longitudinal deceleration can be detected which corresponds in its mean value per unit time to the desired brake force, however.

Besides, it is arranged for that the measures involve a change of the pedal-travel/brake-force characteristics.

The device of the invention for implementing the method provides a central control unit sensing the safety-relevant operating conditions and triggering measures. The central control unit can be integrated into an instrument combination device.

BRIEF DESCRIPTION OF THE DRAWINGS

The only FIGURE represents a chronological order starting from the report of a critical operating condition to the driver by means of an optical or acoustic signal until the remedy of the critical operating condition.

DETAILED DESCRIPTION OF THE PREFERRED EMBODIMENTS

Figure 1:
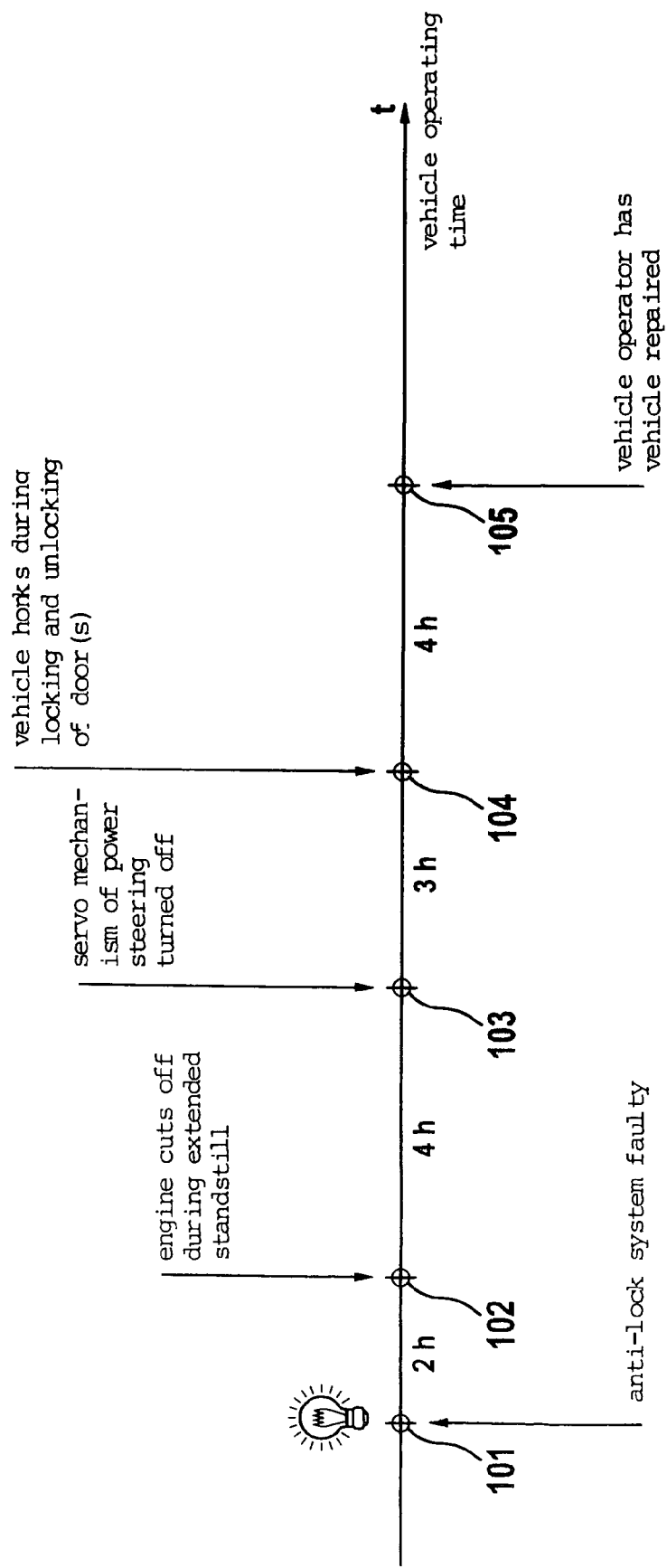

Methods for transmitting critical operating conditions of systems and system components of a motor vehicle are known from the state of the art. In general, an optical or an audible signal is produced and sent to the driver when a system or a system component of the motor vehicle reaches a critical operating condition. If, for example, the anti-lock system is defective or operative only within limits, this critical operating condition is transmitted to the driver by means of a so-called small control lamp, with the control lamp mounted in the instrument panel lighting up in an enamel for signals. If the driver ignores this alarm signal, or is the control lamp defective, the critical operating condition of a motor vehicle system is not transmitted to the driver, what leads to a substantial loss in the general traffic safety. To ensure the transmission of a critical operating condition of a motor vehicle system to the driver, according to the present invention, further measures are provided in addition to optical and audible signals, making the driver aware of the critical operating condition. The target of these measures is to considerably limit the driving comfort of the driver. This will induce the driver to see a workshop, and the critical operating condition can be removed professionally and shortly after the critical operating condition has occurred.

It is arranged for that the measures for reducing the driving comfort are carried out on a temporally limited basis and on a recurrent basis. This means that the provided measures are carried out once to begin with, and within time limits and, if the driver does not feel compelled to seek advice in a workshop, will be recurrent with the progressive operating time of the motor vehicle and a continuing critical operating condition. Besides, the current driving situation is taken into consideration when executing the measures for reducing the comfort. Thus, the deactivation of the internal combustion engine unwanted by the driver is performed as a measure for reducing the driving comfort only during standstill of the motor vehicle in order not to adversely affect the general safety.

One embodiment of the method of the invention is illustrated in the drawing. The illustrated stretch of time mirrors the operating time of the motor vehicle. The anti-lock system of the braking system fails at time 101. This fact is conveyed to the driver at time 101 by means of an optical signal of the control lamp. If the control lamp is defective or if the driver ignores the optical signal, a first measure for reducing the driving comfort is initiated after another operating time of the motor vehicle of two hours. Starting from time 102, the internal combustion engine is switched off during longer phases of standstill, e.g. while the driver is waiting to continue driving in front of a red light. It is thus signaled to the driver that his motor vehicle is malfunctioning. In addition, the driving comfort is limited by the re-start of the internal combustion engine which must be performed manually, what induces the driver to go to a workshop for eliminating the actual cause of the internal combustion machine disconnecting several times, i.e. the defective anti-lock system.

If the driver continues ignoring the obvious losses in comfort, a second measure will be taken at time 103, meaning four hours after the first measure has been initiated. To this end, the power steering system is disconnected, what means a considerable loss in driving comfort for the driver. However, the power steering is disconnected only after deactivation of the internal combustion engine, in order that the driver does not have to expect a changed expenditure of force for turning the steering wheel during the current driving operation. If the driver now as before does not seek help in a workshop, a third measure to reduce the driving comfort is initiated at time 104. To this end, the acoustic warning device (horn) is actuated in such a fashion that a short signal is generated as soon as the driver opens or closes the doors of the motor vehicle.

After another four hours of operating time, during which the three described measures for reducing the driving comfort were effective, the driver consults a workshop at time 105 and has the defective anti-lock system repaired. The effect is that a critical operating condition of a system or a system component no longer prevails in the motor vehicle, and the measures introduced for reducing the driving comfort are stopped.

The method of the invention arranges for further measures, which limit the driving comfort of the driver and make him aware of the safety-critical operating condition.

As this occurs, an activation of the window lifters unwanted by the driver during standstill of the motor vehicle represents a reduction of the driving comfort exactly as the unwanted deactivation of the multimedia device of the motor vehicle. Another measure limiting the driving comfort of the driver is realized by the actuation of the electrically adjustable exterior rearview mirrors or the electrically adjustable seats during standstill of the motor vehicle, which is unwanted by the driver. An activation of the dimmed headlight unwanted by the driver also represents a loss of the driving comfort for the driver. Due to their effect on the driver, these measures are appropriate to make the driver notice a critical operating condition of the motor vehicle and induce him to see a workshop.

Further measures making the driver aware of the fact that his motor vehicle has a defect are achieved by means of a raised temperature indication or a faulty rotational speed indication of the internal combustion engine. A faulty oil-level tell-tale or a faulty tank capacity tell-tale also indicate a critical operating condition of a motor vehicle system to the driver.

The measures being carried out for the purpose of warning the driver are selected in consideration of the duration of the safety-critical operating condition. If a safety-critical operating condition lasts beyond a predetermined stretch of time, a measure is chosen which limits the driving comfort for the driver to a greater degree. This will expressly indicate to the driver that he must see a workshop. Besides, the selection of the measures for reducing the driving comfort is determined in dependence on the seriousness of the safety-critical operating condition. A less serious safety-critical operating condition will consequently entail a less significant measure for reducing the driving comfort than a safety-critical operating condition that takes a direct effect on the traffic safety.

In a motor vehicle having a braking system with electronically adjustable brake forces, the method of the invention provides that the braking request of the driver is realized in a modified manner when a safety-critical operating condition shall be conveyed. To this end, an additional signal is produced in an electronic control and regulation unit (hereinbelow referred to as ECU) provided in the braking system, which influences the desired brake force to such effect that the driver feels a fluctuation of the longitudinal deceleration which in the average time value corresponds to the desired brake force, however. This modified realization of the brake force request also represents a reduction of the driving comfort for the driver. Another measure for transmitting a safety-critical operating condition to the driver is realized by the change of the pedal-travel/brake-force characteristics in a motor vehicle with electronically adjustable brake forces. In this arrangement, the ECU changes the pedal-travel/brake-force characteristics to which the driver is accustomed to such end that the driver is limited in his driving comfort due to the unusual new operation of the braking system.

To implement the method of the invention, a central control unit is provided to which the safety-relevant operating conditions of the systems or the system components of the motor vehicle are sent. Starting from this central control unit, the appropriate measure for the reduction of the driving comfort is chosen, as has been described in detail, and the control unit of the system related to the measure is actuated accordingly. It is especially favorable that the central control unit is integrated into the instrument combination device because in this case the safety-critical operating conditions in prior-art driver information systems are sent to the driver by means of the known control lamps. Starting from the delivered safety-critical operating conditions, the measures for reducing the driving comfort can be reliably initiated.

However, it is also possible to initiate the methods for reducing the driving comfort in a decentralized fashion. This implies that each system having a safety-critical operating condition will directly introduce measures for reducing the driving comfort. The above-mentioned braking system with electronically adjustable brake forces will consequently carry out the modified realization of the braking request of the driver or a change in the pedal-travel/brake-force characteristics when a safety-critical operating condition occurs.

The invention claimed is:

1. A method for transmitting a safety-critical operating condition of a safety-critical system of a motor vehicle to the driver, wherein measures are provided making the driver aware of the safety-critical operating condition by way of an impaired comfort, wherein the measures involve a non-driver initiated deactivation of the internal combustion engine during standstill of the motor vehicle.

2. The method as claimed in claim 1, wherein the measures are taken on a temporally limited basis, a recurrent basis or a combination thereof.

3. The method as claimed in claim 1, wherein the measures are carried out in consideration of the current driving situation.

4. The method as claimed in claim 1, wherein the selection of the measures depends on the duration, the seriousness or the duration and seriousness of the safety-critical operating condition as regards the safety of operation of the motor vehicle.

5. The method as claimed in claim 1, wherein the measures involve a non-driver initiated deactivation of the multimedia device.

6. The method as claimed in claim 1, wherein the measures involve a non-driver initiated switching off the power steering system.

7. The method as claimed in claim 1, wherein the measures involve an additional signal in a brake system with electronically adjustable brake forces which influences a desired brake force to such effect that a fluctuation of a longitudinal deceleration can be detected which corresponds in its mean value per unit time to the desired brake force.

8. The method as claimed in claim 7, wherein the measures involve a change of pedal-travel/brake-force characteristics.

9. Device for implementing the method as claimed in claim 1, wherein a central control unit is provided sensing the safety-relevant operating conditions and triggering measures.

10. The device as claimed in claim 9, wherein the central control unit is integrated into an instrument combination device.

11. A method for transmitting a safety-critical operating condition of a safety-critical system of a motor vehicle to the driver, wherein measures are provided making the driver aware of the safety-critical operating condition by way of an impaired comfort, wherein the measures involve a non-driver initiated actuation of an acoustic alarm device when the doors of the motor vehicle are opened and closed.

12. A method for transmitting a safety-critical operating condition of a safety-critical system of a motor vehicle to the driver, wherein measures are provided making the driver aware of the safety-critical operating condition by way of an impaired comfort, wherein the measures involve a non-driver initiated operation of the electric window lifters during standstill of the motor vehicle.

13. A method for transmitting a safety-critical operating condition of a safety-critical system of a motor vehicle to the driver, wherein measures are provided making the driver aware of the safety-critical operating condition by way of an impaired comfort, wherein the measures involve a raised temperature indication or an incorrect rotational speed indication of the internal combustion engine of the motor vehicle.

14. A method for transmitting a safety-critical operating condition of a safety-critical system of a motor vehicle to the driver, wherein measures are provided making the driver aware of the safety-critical operating condition by way of an impaired comfort, wherein the measures represent a faulty oil-level tell-tale or a faulty tank capacity tell-tale.

15. A method A method for transmitting a safety-critical operating condition of a safety-critical system of a motor vehicle to the driver, wherein measures are provided making the driver aware of the safety-critical operating condition by way of an impaired comfort, wherein the measures involve a non-driver initiated actuation of the electrically adjustable outside rearview mirrors or the electrically adjustable seats during standstill of the motor vehicle.

16. A method A method for transmitting a safety-critical operating condition of a safety-critical system of a motor vehicle to the driver, wherein measures are provided making the driver aware of the safety-critical operating condition by way of an impaired comfort, wherein the measures involve a non-driver initiated switching on the dimmed headlight.

* * * * *